3,471,556
PRODUCTION OF UNSATURATED
ALIPHATIC ACIDS
Goichi Yamaguchi and Shigeo Takenaka, Tokyo, Japan, assignors to Nippon Kayaku Company, Ltd., Tokyo, Japan, a corporation of Japan
No Drawing. Filed Nov. 24, 1965, Ser. No. 509,603
Claims priority, application Japan, Oct. 14, 1965, 40/62,665
Int. Cl. C07c 51/26, 51/32; B01j 11/26
U.S. Cl. 260—530
10 Claims

ABSTRACT OF THE DISCLOSURE

Acrylic and methacrylic acids are obtained by the vapor phase oxidation of acrolein and methacrolein with air or oxygen in the presence of a catalyst such as $Ni_{10.5}FeBiPMo_{12}O_{57}$.

---

The present invention relates to a process for the production of unsaturated aliphatic acids and in particular pertains to the production of acrylic acid or methacrylic acid by the vapor phase oxidation of acrolein or methacrolein by molecular oxygen or air in the presence of a novel catalyst corresponding to the empirical formula:

$$Ni_aCo_bFe_cBi_dP_eMo_fO_g$$

wherein $a$ is 0 to 20, $b$ is 0 to 15, $a+b$ equals 2 to 20, $c$ is 0.1 to 7, $d$ is 0.1 to 4, $e$ is 0.1 to 2, $f$ is about 12 and $g$ is 35 to 85.

According to the process of this invention the catalysts used in the vapor phase oxidation produce unsaturated aliphatic acids in excellent yields and are particularly useful in the production of acrylic acid from acrolein and methacrylic acid from methacrolein.

The use of the catalyst containing the oxides of bismuth, molybdenum and phosphorus in the production of unsaturated aliphatic acids from the corresponding unsaturated aliphatic aldehydes by vapor phase oxidation is known in the art. None of the previously described processes appear to be of a commercial process quality. The instant process, however, produces excellent yields of unsaturated acids and other useful products. The instant process, in a representative example, produces useful product yields of on the order of 70% along with high conversions on the order of 90%.

In the present specfication the following definitions are employed:

Conversion (percent)
$$= \frac{\text{Mols of aldehyde converted}}{\text{Mols of aldehyde fed}} \times 100$$

Selectivity (percent)
$$= \frac{\text{Mols of acid obtained}}{\text{Mols of aldehyde converted}} \times 100$$

Single Pass Yield (percent)
$$= \frac{\text{Mols of acid obtained}}{\text{Mols of aldehyde fed}} \times 100$$
$$= \text{Conversion} \times \text{Selectivity}$$

CATALYST

The catalyst useful in the process of the present invention is the homogeneous mixture, compound or possibly a complex of some unknown physical or chemical nature made up of the oxides of iron, bismuth, phosphorus and molybdenum, and furthermore nickel oxide or cobalt oxide. The composition is conveniently expressed in the following empirical formula:

$$Ni_aCo_bFe_cBi_dP_eMo_fO_g$$

wherein $a$ is 0 to 20, $b$ is 0 to 15, $a+b$ equals 2 to 20, $c$ is 0.1 to 7, $d$ is 0.1 to 4, $e$ is 0.1 to 2, $f$ is about 12 and $g$ is 35 to 85.

In particular, the preferred catalyst of this invention can be expressed in the following three empirical formulae:

$$Ni_aFe_bBi_cP_dMo_eO_f$$

wherein $a$ is 3 to 14, $b$ is 1 to 3, $c$ is 1 to 3, $d$ is about 1, $e$ is 12 and $f$ is 45 to 70;

$$Co_aFe_bBi_cP_dMo_eO_f$$

wherein $a$ is 2 to 7, $b$ is 1 to 3, $c$ is 1 to 3, $d$ is about 1, $e$ is 12 and $f$ is 45 to 70; and $$Ni_aCo_bFe_cBi_dP_eMo_fO_g$$

wherein $a$ is smaller than 14, $b$ is smaller than 7, $a+b$ equals 2 to 14, at least one of $a$ and $b$ is not zero, $c$ is 1 to 3, $d$ is 1 to 3, $e$ is about 1, $f$ is 12 and $g$ is 45 to 70. The first preferred catalyst mentioned above can also be expressed as a composition containing the following components:

| | Mole percent |
|---|---|
| Nickel phosphomolybdate | 20–99.8 |
| Iron phosphomolybdate | 0.1–40 |
| Bismuth phosphomolybdate | 0.1–40 | and the more preferred catalyst of this type has the following composition:

| | Mole percent |
|---|---|
| Nickel phosphomolybdate | 80–90 |
| Iron phosphomolybdate | 5–10 |
| Bismuth phosphomolybdate | 5–10 |

The catalyst of this invention is usually prepared by adding phosphoric acid to an aqueous solution of the suitable molybdenum compound such as ammonium molybdate, and then an aqueous solution of a water-soluble iron salt and bismuth salt and furthermore nickel salt, cobalt salt or the mixture thereof is added to the phosphomolybdic acid solution. This preparation, however, may be varied as one likes. For example, an aqueous solution of the suitable molybdenum compound is added to an aqueous solution of a water-soluble salt and then phosphoric acid is added. The resulting slurry is then heated with a carrier, if desired, to remove water and dry the solid cake which forms. The solid cake is then calcined at an elevated temperature in the air. This calcination is useful for making the specific surface area of the catalyst proper and increasing the selectivity. Suitable water-soluble salts for the preparation of the catalysts of this invention are nickel nitrate, cobalt nitrate, ferric nitrate and bismuth nitrate, for instance. In special cases, agents which form these water-soluble salts, such as the mixture of metal and acid or of metal oxide and acid may be used in place of water-soluble salts. Molybdenum oxide, molybdic acid or phosphomolybdic acid may suitably be used in place of ammonium molybdate.

The catalyst embodied herein is particularly effective when deposited upon a carrier. Suitable carriers include silica, silicon carbide, alumina and borophosphoric acid. The carrier may be added as a sol or a gel to the phosphomolybdate slurry before the catalyst is dried. The catalyst is useful in many solid physical forms such as grains and pellets. The catalyst of this invention is suitable for use in fixed bed, fluidized bed or moving bed reactors.

THE PROCESS CONDITIONS

The process of this invention is carried out at an elevated temperature between 250 and 450° C. and at pressure of from 0.5 to 10 atmospheres, and preferably at a temperature of from 300 to 450° C. at atmospheric pressure.

The contact time of the gaseous feed mixture comprising aldehyde, oxygen and steam with catalyst bed is between 1 and 20 seconds and preferably between 1 and 15 seconds.

The composition of the feed gas may vary over a wide range but it is preferred to use from 0.5 to 4 mols of molecular oxygen and 3 to 20 mols of steam per mole of aldehyde.

In general, air is used as the source of the molecular oxygen in the instant process; however, molecular oxygen, per se, or mixtures of oxygen and inert gases such as nitrogen, carbon dioxide, etc., may also be used.

Since the reaction is exothermic, the temperature within the reactor must be regulated in order to control the reaction. It is preferred that the reactor is placed in a fluidized solids bath, a salt bath such as a molten potassium nitrate bath or a molten metal bath such as a tin bath.

The process of the present invention is further illustrated by the following examples.

EXAMPLE 1

(A) 163 grams of nickel nitrate were dissolved in 80 ml. of distilled water; 21.6 grams of ferric nitrate were dissolved in 12 ml. of distilled water; 25.0 grams of bismuth nitrate were dissolved in 18 ml. of distilled water containing 2.4 ml. of concentrated nitric acid and all of the foregoing solutions were combined.

(B) 113.6 grams of ammonium molybdate were dissolved in 140 ml. of distilled water and 6.3 grams of 85% phosphoric acid were then added.

Solution B, which was pale yellow in color, was added to solution A and to the resulting slurry were added 150 grams of borophosphoric acid.

The resulting slurry was dried and heated at 400° C. in air. The cooled mass was pulverized, the powder was pelleted and then calcined at 500° C. for six hours.

The catalyst was found to have the following empirical formula:

$$Ni_{10.5}Fe_1Bi_1P_1Mo_{12}O_{57}$$

EXAMPLE 2

(A) 186 grams of nickel nitrate were dissolved in 92 ml. of distilled water; 28 grams of ferric nitrate were dissolved in 16 ml. of distilled water; 17.4 grams of bismuth nitrate were dissolved in 13 ml. of distilled water containing 1.7 ml. of concentrated nitric acid and all of the foregoing solutions were combined.

(B) 113.6 grams of ammonium molybdate were dissolved in 140 ml. of distilled water and 6.3 grams of 85% phosphoric acid were then added.

Solution B, which was pale yellow in color, was added to solution A and to the resulting slurry were added 60 grams of silica in the form of an aqueous sol. The resulting slurry was dried and heated at 400° C. in air. The cooled mass was pulverized, the powder was pelleted and then calcined at 500° C. for six hours. The catalyst was found to have the following empirical formula:

$$Ni_{12}Fe_{1.3}Bi_{0.7}P_1Mo_{12}O_{56}$$

EXAMPLES 3–10

Table 1 shows some variations of the manufacturing procedure and the compositions of catalyst prepared by the procedure of Example 2, and the procedure was that of Example 2 except for the variation in conditions shown in Table 1.

TABLE 1

| Example Number | Nickel Nitrate (grams) | Cobalt Nitrate (grams) | Ferric Nitrate (grams) | Bismuth Nitrate (grams) | Ammonium Molybdate (grams) | Phosphoric Acid, 85% (grams) | Carrier SiO2 (grams) | Empirical Formula of Catalyst |
|---|---|---|---|---|---|---|---|---|
| 3 | 155 | 4.6 | 21.6 | 25 | 113.6 | 6.3 | 40 | $Ni_{10}Co_{0.3}Fe_1Bi_1P_1Mo_{12}O_{57}$ |
| 4 | 155 | 4.6 | 21.6 | 25 | 113.6 | 3.15 | 40 | $Ni_{10}Co_{0.3}Fe_1Bi_1P_{0.5}Mo_{12}O_{56}$ |
| 5 | | 145 | 32.4 | 37.6 | 170.0 | 9 | 60 | $Co_6Fe_1Bi_1P_1Mo_{12}O_{50}$ |
| 6 | 105 | 96.8 | 32.4 | 37.6 | 170.0 | 9 | 60 | $Ni_{4.5}Co_4Fe_1Bi_1P_1Mo_{12}O_{54}$ |
| 7 | 325 | | 16.2 | 7.6 | 170.0 | 9.4 | 60 | $Ni_{14}Fe_{0.5}Bi_{0.2}P_1Mo_{12}O_{60}$ |
| 8 | 162.6 | 48.4 | 32.4 | 37.6 | 170.0 | 13.5 | 60 | $Ni_7Co_2Fe_1Bi_1P_{1.5}Mo_{12}O_{55}$ |
| 9 | 46.5 | 24.2 | 97.2 | 112.8 | 170.0 | 9.4 | 60 | $Ni_2Co_1Fe_2Bi_3P_1Mo_{12}O_{52}$ |
| 10 | 186 | | 28 | 17.4 | 113.6 | 1.2 | 60 | $Ni_{12}Fe_{1.3}Bi_{0.7}P_{0.2}Mo_{12}O_{54}$ |

EXAMPLE 11

50 ml. of the catalyst of Example 1 were placed in a reactor 20 mm. in diameter dipped in a molten potassium nitrate bath maintained at about 370° C.

A gaseous mixture composed as follows was passed over the catalyst at atmospheric pressure:

|  | Mol ratios |
|---|---|
| Acrolein | 1 |
| Air | 10.8 |
| Steam | 11 |

The apparent contact time was 7.65 seconds.

The conversion, single pass yield and selectivity of product by this reaction are as follows:

|  | Percent |
|---|---|
| Conversion | 98.2 |
| Selectivity of acrylic acid | 61.2 |
| Single pass yield of acrylic acid | 60.2 |
| Single pass yield of acetic acid | 10.1 |

EXAMPLE 12

140 ml. of the catalyst of the empirical formula:

$$Ni_{12}Fe_{1.3}Bi_{0.7}P_1Mo_{12}O_{56}$$

(carrier is $SiO_2$) were placed in a reactor 20 mm. in diameter dipped in a molten potassium nitrate bath maintained at about 370° C.

A gaseous mixture composed as follows was passed over the catalyst at atmospheric pressure:

|  | Mol ratios |
|---|---|
| Acrolein | 1 |
| Air | 7 |
| Steam | 7 |

The apparent contact time was 5 seconds.

The conversion, single pass yield and selectivity of product by this reaction are as follows:

|  | Percent |
|---|---|
| Conversion | 88.5 |
| Selectivity of acrylic acid | 60.2 |
| Single pass yield of acrylic acid | 52.3 |

EXAMPLES 13–20

Table 2 shows some variations of the oxidation process of Example 12 and the procedure was that of Example 12 except for the variation in conditions shown in Table 2 and a feed composition of acrolein:air:steam on a mol basis of 1:8:15 was employed.

TABLE 2

| Example Number | Empirical Formula of Catalyst | Reaction Conditions | | Conversion (percent) | Selectivity Acrylic Acid (percent) | Single Pass Yield Acrylic Acid (percent) |
| --- | --- | --- | --- | --- | --- | --- |
| | | Contact Time (sec.) | Bath Temp. (° C.) | | | |
| 13 | $Ni_{10}Co_{0.3}Fe_1Bi_1P_1Mo_{12}O_{59}$ | 4.5 | 340 | 80 | 62.5 | 50 |
| 14 | $Ni_{10}Co_{0.3}Fe_1Bi_1P_{0.5}Mo_{12}O_{55}$ | 4.5 | 335 | 75 | 60 | 45 |
| 15 | $Co_6Fe_1Bi_1P_1Mo_{12}O_{50}$ | 5.5 | 360 | 67 | 58 | 39 |
| 16 | $Ni_{4.5}Co_4Fe_1Bi_1P_1Mo_{12}O_{54}$ | 5 | 340 | 70.5 | 58 | 41 |
| 17 | $Ni_{14}Fe_{0.3}Bi_{0.2}P_1Mo_{12}O_{60}$ | 5 | 320 | 75 | 42 | 31.5 |
| 18 | $Ni_7Co_2Fe_1Bi_1P_{1.5}Mo_{12}O_{55}$ | 5 | 350 | 72 | 38 | 27 |
| 19 | $Ni_2Co_1Fe_3Bi_3P_1Mo_{12}O_{52}$ | 4.5 | 340 | 66 | 35 | 23 |
| 20 | $Ni_{12}Fe_{1.3}Bi_{0.7}P_{0.2}Mo_{12}O_{54}$ | 5 | 350 | 80.5 | 61.5 | 49.5 |

$Ni_{12}Fe_{1.3}Bi_{0.7}P_1Mo_{12}O_{56}$

EXAMPLE 21

140 ml. of the catalyst of the empirical formula:
were placed in a reactor 20 mm. in diameter immersed in a molten potassium nitrate bath maintained at about 330° C.

A gaseous mixture composed as follows was passed over the catalyst at atmospheric pressure:

| | Mol ratios |
| --- | --- |
| Methacrolein | 1 |
| Air | 10 |
| Steam | 10 |

The apparent contact time was 7 seconds.

The conversion, single pass yield and selectivity of product by this reaction are as follows:

| | Percent |
| --- | --- |
| Conversion | 71.1 |
| Selectivity of methacrylic acid | 53.4 |
| Single pass yield of methacrylic acid | 38.0 |

EXAMPLE 22

140 ml. of the catalyst of the empirical formula:

$Ni_{10}Co_{0.3}Fe_1Bi_1P_1Mo_{12}O_{56}$ were placed in a reactor 20 mm. in diameter immersed in a molten potassium nitrate bath maintained at about 315° C.

A gaseous mixture composed as follows was passed over the catalyst at atmospheric pressure:

| | Mol ratios |
| --- | --- |
| Methacrolein | 1 |
| Air | 10 |
| Steam | 10 |

The apparent contact time was 6 seconds.

The conversion, single pass yield and selectivity of product by this reaction are as follows:

| | Percent |
| --- | --- |
| Conversion | 60.3 |
| Selectivity of methacrylic acid | 55.2 |
| Single pass yield of methacrylic acid | 33.0 |

We claim:

1. The process for oxidizing unsaturated aldehydes to unsaturated carboxylic acids comprising reacting in vapor phase at a temperature of from 250 to 450° C., at a pressure of from 0.5 to 10 atmospheres absolute, an unsaturated aldehyde selected from the group consisting of acrolein and methacrolein with a gas selected from the group consisting of air, oxygen and mixtures thereof in the presence of an oxidation catalyst of the empirical formula:

$Ni_aCo_bFe_cBi_dP_eMo_fO_g$ wherein $a$ is 0 to 20, $b$ is 0 to 15, $a+b$ equals 2 to 20, $c$ is 0.1 to 7, $d$ is 0.1 to 4, $e$ is 0.1 to 2, $f$ is about 12 and $g$ is 35 to 85.

2. The process of claim 1 wherein the reaction is carried out in the presence of the catalyst of the empirical formula:

$Ni_aFe_bBi_cP_dMo_eO_f$ wherein $a$ is 3 to 14, $b$ is 1 to 3, $c$ is 1 to 3, $d$ is about 1, $e$ is 12 and $f$ is 45 to 70.

3. The process of claim 1 wherein the reaction is carried out in the presence of the catalyst of the empirical formula:

$Co_aFe_bBi_cP_dMo_eO_f$ wherein $a$ is 2 to 7, $b$ is 1 to 3, $c$ is 1 to 3, $d$ is about 1, $e$ is 12 and $f$ is 45 to 70.

4. The process of claim 1 wherein the reaction is carried out in the presence of the catalyst of the empirical formula:

$Ni_aCo_bFe_cBi_dP_eMo_fO_g$ wherein $a$ is smaller than 14, $b$ is smaller than 7, $a+b$ equals 2 to 14, at least one of $a$ and $b$ is not zero, $c$ is 1 to 3, $d$ is 1 to 3, $e$ is about 1, $f$ is 12 and $g$ is 45 to 70.

5. The process of claim 1 wherein the reaction is carried out in the presence of steam.

6. The process of claim 5 wherein the contact time is from 1 to 15 seconds.

7. The process of claim 6 wherein the reaction is carried out at a temperature of from 300 to 450° C.

8. The process of claim 7 wherein the unsaturated aldehyde is acrolein.

9. The process of claim 7 wherein the unsaturated aldehyde is methacrolein.

10. The process of claim 8 wherein the mol ratios of oxygen, steam and acrolein are 0.5–4:3–20:1, respectively.

References Cited

UNITED STATES PATENTS 3,087,964   4/1963   Koch et al. _____ 260—530

FOREIGN PATENTS 999,836   7/1965   Great Britain.

LORRAINE A. WEINBERGER, Primary Examiner

D. STENZEL, Assistant Examiner

U.S. Cl. X.R.

252—437